United States Patent [19]

Hayashida

[11] Patent Number: 4,513,700
[45] Date of Patent: Apr. 30, 1985

[54] INDUCTION SYSTEM FOR SPARK IGNITION ENGINE OF FUEL INJECTION TYPE

[75] Inventor: Takanori Hayashida, Iwata, Japan

[73] Assignee: Yamaha Hatsudoki Kabushiki Kaisha, Iwata, Japan

[21] Appl. No.: 39,598

[22] Filed: May 16, 1979

[30] Foreign Application Priority Data

May 17, 1978 [JP] Japan ................................ 53-57681

[51] Int. Cl.³ ............................................. F02M 61/14
[52] U.S. Cl. ................................. 123/179 L; 123/432; 123/442; 123/445; 123/588
[58] Field of Search ........ 123/139 AW, 75 B, 179 L, 123/179 G, 179 A, 127, 432, 442, 445, 588

[56] References Cited

U.S. PATENT DOCUMENTS

| Re. 26,603 | 6/1969 | Von Seggern et al. | 123/75 B |
|---|---|---|---|
| 2,511,213 | 6/1950 | Leslie | 123/139 AW |
| 3,543,736 | 12/1970 | Suzuki et al. | 123/119 R |
| 3,685,503 | 8/1972 | Jackson | 123/127 |
| 3,704,702 | 12/1972 | Aono | 123/179 G |
| 3,716,034 | 2/1973 | Schmid | 123/179 L |
| 3,742,923 | 7/1973 | Obländer et al. | 123/139 AW |
| 3,964,457 | 6/1976 | Coscia | 123/179 L |
| 4,136,653 | 1/1979 | Knapp et al. | 123/139 AW |
| 4,194,474 | 3/1980 | Endo | 123/432 |
| 4,216,757 | 8/1980 | Romann | 123/179 L |

FOREIGN PATENT DOCUMENTS 2211072 9/1973 Fed. Rep. of Germany ...... 123/139 AW

Primary Examiner—Andrew M. Dolinar
Attorney, Agent, or Firm—Ernest A. Beutler

[57] ABSTRACT

An induction system for an internal combustion engine that improves performance, particularly at low speeds, through the use of a relatively small auxiliary induction system, through which a substantial portion of the low speed charge requirements of the engine are supplied. In accordance with this invention, a cold starting enrichment device in the form of a fuel injection nozzle is provided in a main passage of the auxiliary induction system. In accordance with one feature, a throttle valve is provided in an induction passage and has a smaller cross-sectional area than the passage in its idle position, so as to permit the idle air flow around the periphery of the throttle valve. In accordance with another feature, a temperature responsive air by-pass is provided for flowing additional air into the auxiliary induction passage during cold running, so as to improve warm-up time.

10 Claims, 3 Drawing Figures

INDUCTION SYSTEM FOR SPARK IGNITION ENGINE OF FUEL INJECTION TYPE

BACKGROUND OF THE INVENTION

This invention relates to an internal combustion engine and, more particularly, to an improved induction system for such an engine.

Recently it has been proposed to improve the low speed performance of an internal combustion engine without sacrificing high power output, by providing a relatively small cross-sectional area, auxiliary induction passage that delivers a substantial portion of the low speed charge requirements to the engine chambers. The use of such an auxiliary induction system has been found to significantly improve low speed running by increasing turbulence and, accordingly, flame propagation in the chambers at the time of combustion. In accordance with this invention, several improvements are provided for this general type of induction system.

One particularly critical operating period for an internal combustion engine is under cold starting and cold running conditions. Under these conditions, the fuel delivery to the combustion chambers is uneven and must be normally designed to be over-rich so as to insure good running. The use of such over-rich mixtures, however, deteriorates both fuel economy and exhaust emission control.

The use of the small cross-sectional auxiliary induction system, previously described, has been found to improve cold running and warm-up operation of the engine. It is, therefore, a first object of this invention to provide an induction system that further improves cold starting and cold running performance of an internal combustion engine.

One method of improving such cold starting and cold running performance employs the use of a fuel injection nozzle in the auxiliary induction system for providing cold starting and cold running enrichment. By introducing the enriched mixture directly into the auxiliary induction system, fuel vaporization and distribution is significantly improved, due to the high velocity of air flow through the auxiliary induction system, even at low speeds and during cranking. If multiple cylinders are employed, one cold starting fuel injection enrichment nozzle may be employed for several cylinders, as the nozzle discharges into a common supply passage of the auxiliary induction system.

In accordance with another feature and object of the invention, engine warm-up is accelerated by introducing excess air into the auxiliary induction system under cold running conditions. This excess air further improves the amount of fuel vaporization and increases the engine speed, so as to promote faster warm-up. As a result, cold running enrichment may be stopped at an earlier time to improve both efficiency and exhaust emission control.

In accordance with still another feature or the invention, a more effective means for controlling idle air flow is employed from those previously known. Normally it has been the practice to control air flow through an induction system by the use of a butterfly type valve that is rotatably mounted in a portion of the induction passage. The amount of air flow through the induction passage at idle is determined by an initial setting of the throttle valve to something other than its fully closed position. This introduces variations in adjustment and has other disadvantages.

It is, therefore, a yet further object of this invention to provide an improved structure for controlling idle air flow.

SUMMARY OF THE INVENTION

A first feature of this invention is adapted to be embodied in an induction system for an internal combustion engine having a chamber of variable volume in which combustion occurs, a main induction passage terminating in a main intake port for delivering a charge to the chamber, and an auxiliary induction passage terminating in an auxiliary intake port for delivering a charge to the chamber. A charge forming device is provided for delivering fuel to the chamber through at least one of the induction passages. In accordance with this first feature of the invention, a fuel injection nozzle is provided for delivering a cold starting and cold running enrichment to the chamber only through the auxiliary induction passage.

Another feature of the invention is also adapted to be embodied in an engine having main and auxiliary induction passages and a charge forming device as set forth in the immediately preceding paragraph. In accordance with this feature of the invention, the auxiliary induction passage has a substantially lesser effective cross-sectional area than the main induction passage, so that a given mass flow of charge through the auxiliary induction passage will enter the chamber at a significantly greater velocity. In accordance with this feature of the invention, throttle valve means are provided for controlling the ratio of communication of the ports with a chamber during a given cycle of operation of the engine. The throttle valve means are effective to cause substantially all of the idle and low load charge requirements of the chamber to be supplied through the auxiliary induction passage and substantially all of the full load charge requirements to be supplied through the main induction passage. In accordance with this feature of the invention, the throttle valve means includes a first butterfly type throttle valve positioned in one of the induction passages. The first throttle valve has an effective cross-sectional area in its closed position, less than the corresponding area of the related induction passage for permitting flow past this first throttle valve when it is in its closed position. This flow is delivered through the auxiliary induction passage to the chamber for providing at least part of the idle charge requirements for the chamber.

A third feature of this invention is also adapted to be embodied in an internal combustion engine having a variable volume chamber, a main induction passage, and an auxiliary induction passage, as described in the two preceding paragraphs. In accordance with this feature, a charge forming device is also provided for delivering a charge to the chamber through at least one of the induction passages and throttle valve means control the ratio of communication of the passages with the chamber during a given cycle of engine operation. In accordance with this feature of the invention, means are provided for introducing additional charge flow to the chamber through the auxiliary induction passage at temperatures below a predetermined temperature, so as to improve engine warm-up.

A fourth feature of the invention is adapted to be embodied in an induction system for an internal combustion engine having an induction passage with at least a section of cylindrical configuration. A circular throttle valve is supported for rotation about a pivot axis in the cylindrical section of the induction passage for controlling the flow therethrough. The throttle valve has a diameter substantially less than the diameter of the cylindrical section for providing flow around its periphery when it is in its closed position.

DETAILED DESCRIPTION OF THE PREFERRED EMBODIMENT

As is well known, the most difficult running conditions for an internal combustion engine are the low speed and idle situations. During these conditions, the air velocity through the induction system is so low as to provide poor fuel vaporization. Because of this, with conventional engines it has been the practice to employ overly rich mixtures to compensate for this characteristic. Of course, fuel economy and exhaust emission control is severely deteriorated as a result of this compensation. These conditions are further aggravated at low temperatures, since the low temperature of the induction system and engine chambers further retards fuel vaporization.

It has been recently proposed to improve idle and low speed operation without deteriorating high speed performance by providing an auxiliary induction system of relatively small cross-sectional area through which the low speed and idle charge requirements of the engine are supplied. In accordance with this invention, still further improvements are provided for such an induction system to further enhance low temperature operation.

Figure 1:
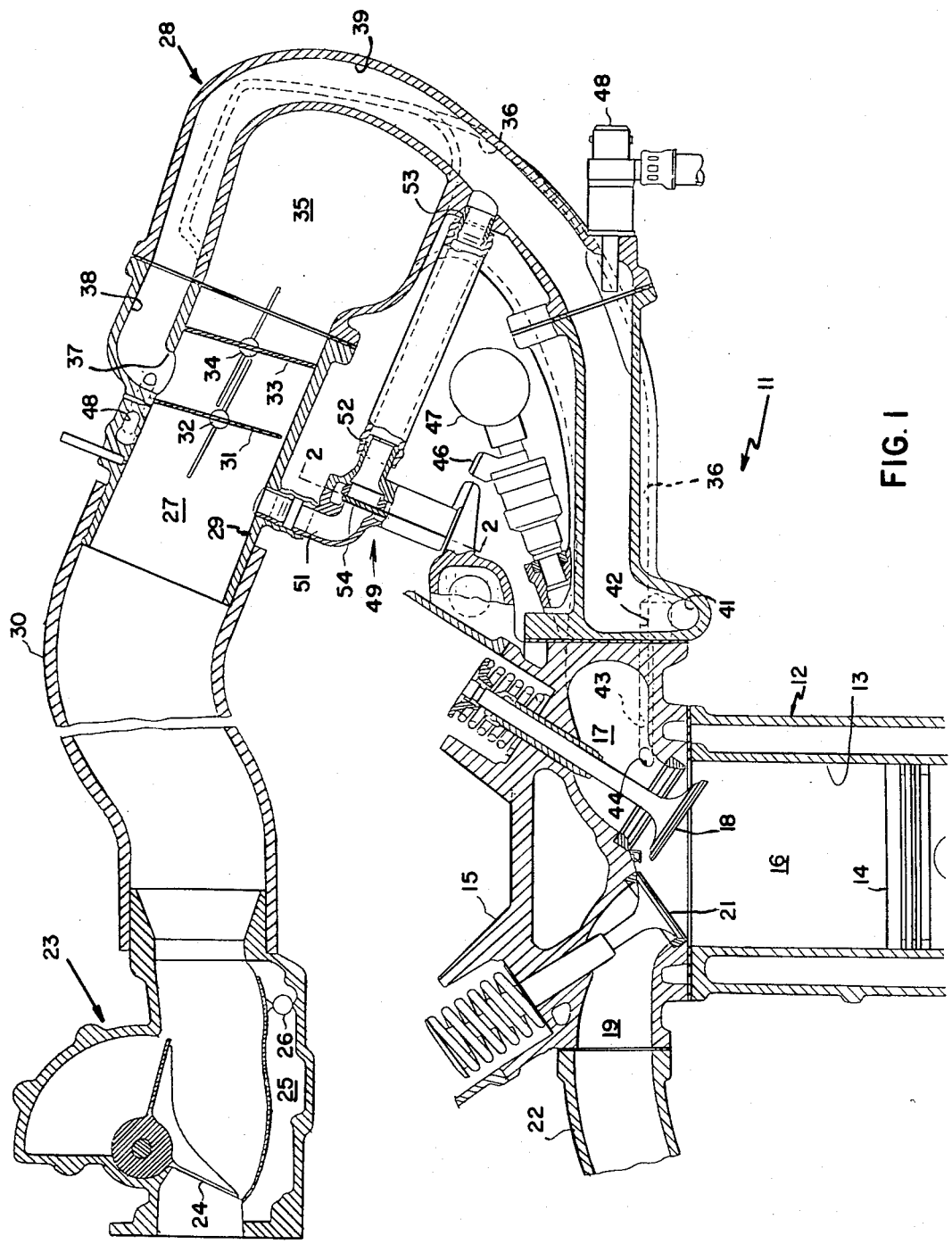
FIG. 1 is a cross-sectional view taken through a single cylinder of a multiple cylinder internal combustion engine embodiment of this invention.

Referring now in detail to the drawings, an internal combustion engine embodying this invention is identified generally by the reference numeral 11. The engine 11 includes a cylinder block 12 having a plurality of cylinder bores 13 in which pistons 14 are supported for reciprocation in a known manner. FIG. 1 is a cross-sectional view taken along the longitudinal axis of one cylinder bore 13. It is believed that those skilled in the art will understand from the following description as to how the invention is applied to the remaining cylinder bores. Except as will be here and after noted, the construction associated with these cylinder bores is the same as discussed herein.

A cylinder head 15 is affixed to the cylinder block 12 and defines with each piston 14 and cylinder bore 13 a chamber 16 of variable volume in which combustion occurs.

The cylinder head 15 is formed with a main intake passage 17 which communicates with each chamber 16 via an intake valve 18 which controls a main intake port formed at the end of the passage 17 that is operated in any known manner. In a like fashion, the spent charge is exhausted from the chambers 16 through cylinder head exhaust passages 19 and suitably operated exhaust valves 21. The exhaust passages 19 all discharge into a common exhaust manifold 22.

As will become apparent, the induction system for the engine 11 includes a main intake system which includes the cylinder head intake passages 17, already described, and an auxiliary induction system. Both the main and auxiliary induction systems have a common air inlet indicated generally by the reference numeral 23, in which an air flow detector 24 is supported for sensing the induction air flow. The detector 24 comprises a rotary valve, the angular position of which is sensed by a potentiometer or the like for controlling the fuel flow rate to associated fuel injection nozzles, to be described through an appropriate electrical circuit of any known type. A by-pass passage 25 is provided in the inlet 23 for by-passing a predetermined amount of air past the detector 24. The amount of by-passed air is controlled by an adjusting screw indicated schematically at 26.

The air flowing from the inlet 23 past the detector 24 and bypass passage 25 is delivered to an air inlet passage 27 of an intake manifold indicated generally by the reference numeral 28 via a flexible conduit 30. The air inlet passage 27 is formed by means of a manifold housing portion 29, in which a primary throttle valve 31 is supported for rotation about a pivot axis defined by a throttle valve shaft 32. A secondary throttle valve 33 is also supported in the housing 29 downstream of the primary throttle valve 31 for rotation about a pivot axis defined by a secondary throttle valve shaft 34.

The passage 27 of the housing 29 communicates downstream of the throttle valves 31 and 33 with a plenum chamber 35. The plenum chamber 35 feeds a number of runners 36 that extend to the respective cylinder head intake passages 17 for delivering the charge from the plenum chamber 35 to the respective chambers 16.

The housing 29 is formed with an auxiliary induction system inlet 37 that is positioned between the throttle valves 31 and 33, when these throttle valves are in their closed positions. The inlet 37 communicates with an auxiliary induction passage 38 formed in the housing 29, which, in turn, communicates with an auxiliary induction passage 39 of the intake manifold 28. Adjacent the cylinder head 15, the intake manifold 28 is formed with a transversely extending passage 41 which is interconnected adjacent each main intake passage 17 of the cylinder head 15 by a drilled passage 42. The passages 42 each communicate with a respective cylinder head auxiliary intake passage 43 that terminates in a respective auxiliary intake port 44, which is juxtaposed to the main intake passage 17 on the upstream side of the intake valve 18.

The auxiliary intake passages 43 of the cylinder head 17 and, specifically, the ports 44, are substantially smaller in cross-sectional area than the effective cross-sectional area of the main induction passages consisting of the runners 36 and cylinder head induction passages 17. As a result, a given mass flow of charge entering the chambers 16 from the auxiliary induction system will enter at a substantially higher velocity than the same charge through the main induction system. This velocity difference is used to increase turbulence and, accordingly, flame propagation at idle and low load conditions, as will become apparent.

The ratio of communication of the main and auxiliary induction systems with the chambers 16 is controlled by the relative positions of the primary and secondary throttle valves 31 and 33. The throttle valves 31 and 33 are connected so as to operate in a staged sequence, so that substantially all of the idle and low load charge requirements of the engine will be supplied through the auxiliary induction system. At high loads, an increasing proportion of the charge requirements are supplied through the main induction passages.

Figure 3:
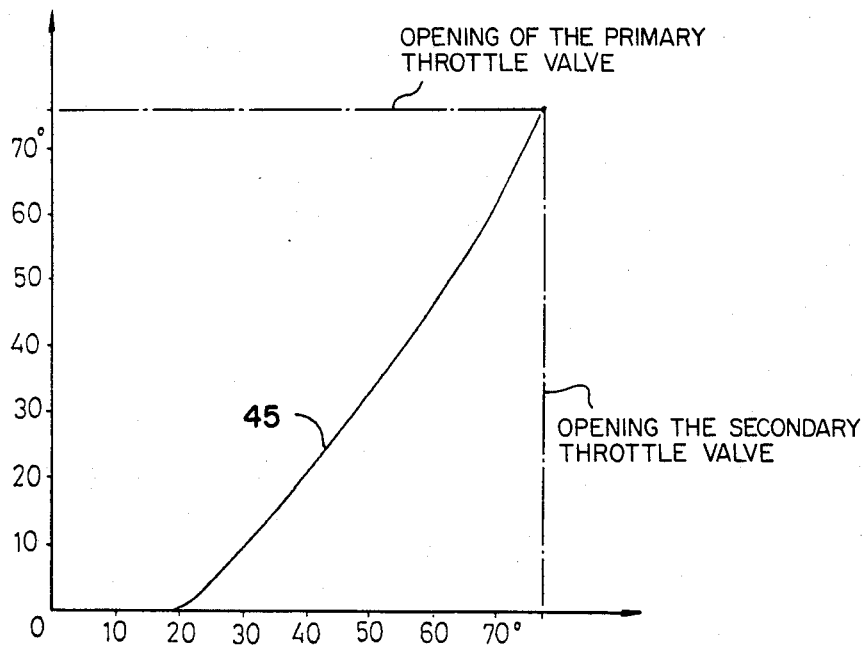
FIG. 3 is a graphical analysis showing the relationship of opening between primary and secondary throttle valves of the embodiment of the invention.

The inter-connection between the throttle valves 31 and 33 may be achieved in any known manner, such as by means of a linkage system (not shown). Preferably, the respective positions of the throttle valves 31 and 33 follows a curve, as shown generally in FIG. 3, wherein the angular position of the primary throttle valve 31 is represented on the ordinate, and the angular position of the secondary throttle valve 33 is represented on the abscissa. As shown by the curve 45, the secondary throttle valve 33 is closed until the primary throttle valve 31 is opened to approximately 20°. During this time period, the closed secondary throttle valve 33 will cause all of the induction system charge to be delivered to the chambers 16 through the auxiliary induction system consisting of the inlet 37, passage 38, 39 and 41, drilled openings 92, cylinder head passages 43, and ports 44.

The fuel for all running conditions, except for cold starting, as will be hereinafter noted, is supplied by individual fuel injector nozzles 46, which are fed by a distribution tube 47 under the control of the flow detector 24. Each nozzle 46 discharges into the main induction system runner 36 of the intake manifold 28 and cylinder head main induction passages 17. The path of fuel discharge is intersected by the discharge of the auxiliary intake ports 44, so as to improve fuel vaporization and mixture distribution within the chambers 16.

The primary throttle valve 31 is circular in shape, as is well known with butterfly type throttle valves, but, unlike conventional throttle valves, is smaller in diameter than the surrounding cylindrical portion of the passage 27. Thus, even when in its fully closed position, the primary throttle valve 31 allows flow past it into the auxiliary induction system inlet 37. Thus, the flow is controlled by the amount of this clearance.

If desired, an idle air passage 48 may be formed in the housing 29 with its opening on the upstream side of the primary throttle valve 31 and its discharge in communication with the auxiliary induction passage 38. An adjustable valve (not shown) can be provided for controlling the amount of this bypass air.

With constructions heretofore known, it has been the practice to provide an enriched fuel mixture under low temperature starting and running. This enrichment is necessary to compensate for the lower volatility of the fuel at low temperatures and the more likely condensation that will result under these conditions. In accordance with this invention, an auxiliary cold starting-running fuel injection nozzle 48 is provided in the common passage 39 of the auxiliary induction system. The nozzle 48 discharges in the general direction of air flow through the passage 39 and is provided with fuel, by any known system, to provide cold starting enrichment and, if desired, a cold running enrichment. Because of the high velocity of the air flow through the auxiliary induction passage 39, which is considerably smaller than the main induction runners 36, and the acceleration of this velocity through the even smaller cylinder head auxiliary induction passages 43, this cold starting fuel will be effectively vaporized so as to improve both fuel economy and reduce exhaust emissions under such cold temperature operation.

Figure 2:
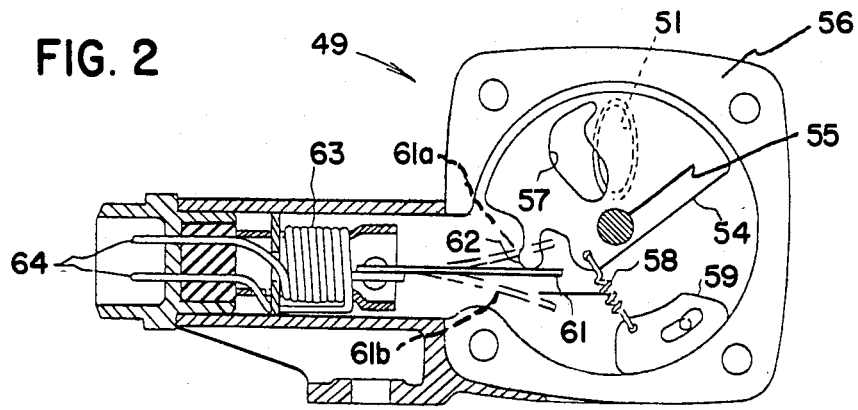
FIG. 2 is an enlarged cross-sectional view taken along the line 2—2 of FIG. 1, and shows the cold running air enrichment device.

Cold running performance and warm up are further improved in accordance with this invention by providing additional by-pass air to the auxiliary induction system at low temperatures. This air is provided by a system indicated generally by the reference numeral 49. The by-pass system includes an inlet passage 51 that communicates with the housing 29 in the portion of the passage 27 upstream of the primary throttle valve 31. The system 49 discharges into the common passage 39 of the auxiliary induction system by means including a passage 52 and nozzle 53. The amount of flow through the passages 51 and 52 and nozzle 53 is controlled by a thermally operated shutter 54. The construction and operation of the thermally operated shutter 54 may be best understood by reference to FIG. 2. As noted in this figure, the shutter 54 is fixed to a shaft 55 and is rotatably supported in a housing 56. The shutter 54 is formed with a contoured aperture 57, which is configured so as to selectively open and close the communication between the passages 51 and 52.

A spring 58 is connected on one side of the pivot axis of the shutter 54 and coacts with an adjusting plate 59 at its other end, so as to bias the shutter 54 toward its closed position, wherein there will be no by-pass air supplied to the auxiliary induction system passage 39.

A bimetal spring 61 extends into the housing 56 and coacts with a projection 62 formed on the shutter 54 so as to control the position in opposition to the action of the spring 58.

An electrical heater 63 encircles the bimetal spring 61 and is supplied with electrical current via terminals 64. The terminals 64 are in communication with a temperature responsive resistance, so that the heating of the bimetal spring 61 will be in relation to the temperature of the engine. At low engine temperatures, the bimetal 61 will be deflected upwardly to the dotted line position 61a, so as to cause the aperture 67 to be in full communication with the passage 51, so as to permit maximum air flow. As the temperature increases due to the heating of the element 63, the bimetal 61 deflects toward the dotted line position 61b and the aperture 57 moves progressively out of communication with the passage 51, so as to diminish and eventually stop the bypass air flow.

The additional air flowing through the bypass port 49 at low temperatures will have the effect of increasing engine speed and, accordingly, warm up will be accelerated.

As has been previously noted, the secondary throttle valve 33 is opened progressively with the throttle valve 31. Previously, idle and low speed operation have been described by reference to FIG. 3. As the primary throttle valve 31 is opened past approximately 20°, the secondary throttle valve 33 commences to open. Thus, an increasing proportion of the air flow for the chambers 16 will pass through the main induction system. The slope of the rate of opening curves of throttle valves 31 and 33 may be determined by the curve 45 and the arrangement is such that both throttle valves reach their fully opened position at approximately the same time.

It should be readily apparent that the described engine significantly improves idle and low speed performance through the use of auxiliary induction system which increases turbulence and, accordingly, flame propagation when in operation. By using the cold starting fuel injection nozzle 48 discharging into a common passage of the auxiliary induction system, a simplified cold starting arrangement is provided that requires only one injection nozzle for multiple cylinders. Furthermore, the high velocity air flow through the auxiliary induction system exists in cold starting and cold running operation, and hence fuel vaporization is also improved. The use of the by-pass air passage, as has been noted, increases low temperature engine speed at idling and, thus, further speeds warm up. Various changes and modifications may be made without departing from the spirit and scope of the invention as defined by the appended claims.

What is claimed is:

1. An induction system for an internal combustion engine having a chamber of variable volume in which combustion occurs, a main induction passage terminating in a main intake port, an auxiliary induction passage terminating in an auxiliary intake port, said auxiliary intake port being disposed relative to said chamber so that said auxiliary induction passage discharges into said chamber at substantially undiminished velocity, the effective cross-sectional area of said auxiliary induction passage being substantially less than the effective cross-sectional area of said main induction passage, throttle valve means for controlling the ratio of communication of said main and auxiliary induction passages with said chamber during a given cycle of engine operation, said throttle valve means comprising a primary throttle valve and a secondary throttle valve, said primary throttle valve and said secondary throttle valve each being disposed in said main induction passage, said secondary throttle valve being positioned posterior to said primary throttle valve, said auxiliary induction passage having its inlet disposed in said main induction passage between said throttle valves wherein closure of said secondary throttle valves diverts flow into said auxiliary induction passage, and a charge forming device for delivering fuel to said chamber through at least one of said induction passages, the improvement comprising a fuel injection nozzle for delivering a cold starting and cold running enrichment to said chamber only through said auxiliary induction passage, temperature responsive means for providing additional air flow into the auxiliary induction passage when the temperature is below a predetermined temperature.

2. An induction system for an internal combustion engine as defined in claim 1, wherein the charge forming device comprises a fuel injection nozzle discharging into the main induction passage.

3. An induction system for an internal combustion engine as defined in claim 1, wherein the engine has a plurality of chambers as defined therein and main and auxiliary induction passages and main and auxiliary intake ports for serving each of said chambers.

4. An induction system for an internal combustion engine as defined in claims 1, 2 or 3, wherein the temperature responsive means comprises a passage having its inlet disposed in the main induction passage anterior to the primary throttle valve and its outlet communicating with the auxiliary induction passage and temperature responsive valve means for controlling the flow therethrough.

5. An induction system for an internal combustion engine as defined in claim 4, wherein the auxiliary intake port is disposed in registry with the main induction passage contiguous to the main intake port.

6. An induction system for an internal combustion engine having a variable volume chamber in which combustion occurs, a main induction passage communicating with said chamber through a main intake port for delivering a charge thereto, an auxiliary induction passage communicating with said chamber through an auxiliary intake port, said auxiliary induction passage having an effective cross-sectional area substantially less than the effective cross-sectional area of said main induction passage for causing a given mass flow of charge through the said auxiliary intake port to enter the chamber at a substantially greater velocity, said auxiliary intake port being disposed relative to said chamber so that the discharge from said auxiliary induction passage enters said chamber at substantially undiminished velocity, a charge forming device for delivering a fuel charge to at least one of said passages, and throttle valve means for controlling the ratio of communication of said ports with said chamber during a given cycle of operation of said engine, said throttle valve means being effective to cause substantially all of the idle load charge requirements of said chamber to be supplied through said auxiliary inductions passage and substantially all of the full load charge requirements of said chamber through said main induction passage, the improvement comprising means for providing additional charge flow to said chamber through said auxiliary induction passage at temperatures below a predetermined temperature to improve low temperature warm up.

7. An induction system for an internal combustion engine as defined in claim 6, wherein the additional flow is provided in response to engine temperature.

8. An induction system for an internal combustion engine as defined in claim 6, wherein the additional flow is provided by a passage having an inlet exposed to atmospheric pressure and an outlet in communication with the auxiliary induction passage and temperature responsive means for controlling the flow therethrough.

9. An induction system for an internal combustion engine as defined in claim 6, wherein the auxiliary induction passage has its inlet communicating with the main induction passage, the throttle valve means comprising a primary throttle valve positioned in the main induction passage anterior to said auxiliary induction passage inlet and a secondary throttle valve positioned in said main induction passage posterior to said auxiliary induction passage inlet and means for operating said primary and secondary throttle valves in sequence.

10. An induction system for an internal combustion engine as defined in claim 9, wherein the additional flow is provided by a passage having an inlet in communication with the main induction passage anterior to the primary throttle valve.

* * * * *

UNITED STATES PATENT AND TRADEMARK OFFICE
CERTIFICATE OF CORRECTION

PATENT NO. : 4,513,700

DATED : April 30, 1985

INVENTOR(S) : Takanori Hayashida

It is certified that error appears in the above-identified patent and that said Letters Patent is hereby corrected as shown below:

Column 1, line 60, "or" should be --of--.

Column 8, lines 10 and 11, Claim 6, lines 4 and 5, delete "for delivering a charge thereto".

Column 8, lines 16-18, Claim 6, lines 10-12, delete "for causing a given mass flow of charge through the said auxiliary intake port to enter the chamber at a substantially greater velocity".

Column 8, line 28, Claim 6, line 22, delete "charge".

Column 8, line 30, Claim 6, line 24, delete "charge".

Column 8, line 33, Claim 6, line 27, delete "charge".

Signed and Sealed this

Tenth Day of December 1985

[SEAL]

Attest:

Attesting Officer

DONALD J. QUIGG

Commissioner of Patents and Trademarks